United States Patent [19]

Nakazaki et al.

[11] 4,271,348
[45] Jun. 2, 1981

[54] ELECTRON BEAM WELDING METHOD AND APPARATUS THEREFOR

[75] Inventors: Takamitsu Nakazaki; Hisanao Kita; Yoji Akutsu, all of Ibaraki, Japan

[73] Assignee: Hitachi, Ltd., Tokyo, Japan

[21] Appl. No.: 48,883

[22] Filed: Jun. 15, 1979

[30] Foreign Application Priority Data

Jun. 16, 1978 [JP] Japan .................. 53-72131

[51] Int. Cl.³ .......................................... B23K 15/00
[52] U.S. Cl. .................. 219/121 ED; 219/121 EC; 219/121 EL; 219/121 ET; 219/137.43
[58] Field of Search ............... 219/121 EB, 121 EC, 219/121 ED, 121 EE, 121 EF, 121 EG, 121 EH, 121 EJ, 121 EK, 121 EL, 121 EM, 121 EQ, 121 ET, 121 EZ, 137.43, 137.2; 239/106, 114, 115, 123

[56] References Cited

U.S. PATENT DOCUMENTS

| | | | |
|---|---|---|---|
| 2,833,913 | 5/1958 | Bernard .................... | 219/137.43 |
| 2,938,994 | 5/1960 | Van Der Willigen ....... | 219/137.2 X |
| 3,175,073 | 3/1965 | Niedzielski et al. ......... | 219/121 EZ |
| 3,284,608 | 11/1966 | McDonald .................... | 219/137.43 |
| 3,393,289 | 7/1968 | Duhamel et al. ............. | 219/121 EZ |
| 3,585,351 | 6/1971 | Hinrichs ........................ | 219/121 EC |
| 3,589,351 | 6/1971 | Shoupp et al. ............... | 219/121 EH X |
| 3,597,576 | 8/1971 | Bernard et al. ................ | 219/137.43 |

FOREIGN PATENT DOCUMENTS

| | | |
|---|---|---|
| 1565029 | 2/1972 | Fed. Rep. of Germany . |
| 2214159 | 10/1973 | Fed. Rep. of Germany . |
| 2211597 | 10/1974 | Fed. Rep. of Germany . |
| 50-129445 | 10/1975 | Japan . |
| 51-50253 | 5/1976 | Japan .................. 219/121 EB |
| 51-75648 | 6/1976 | Japan .................. 219/121 EB |
| 51-109249 | 9/1976 | Japan .................. 219/121 EM |
| 1049057 | 11/1966 | United Kingdom . |

Primary Examiner—Elliot A. Goldberg
Assistant Examiner—E. F. Borchelt
Attorney, Agent, or Firm—Thomas E. Beall, Jr.

[57] ABSTRACT

An electron beam welding apparatus is provided with a magnetic shielding pipe for preventing electron beams emitted from being deflected by stray magnetic fields, and a removing device for removing metal deposit accumulated on a tip portion of the magnetic shielding pipe, which tip portion faces to a weld formed by welding of materials to be welded. The removing device is provided with at least a pair of shutters which move along a tip face of the tip portion to prevent the metal deposit from accumulating on the tip portion. The pair of shutters provides in their central portion a hole for passing electron beams therethrough when they are closed so that welding can continue irrespectively of the movement of the shutters.

6 Claims, 8 Drawing Figures

ELECTRON BEAM WELDING METHOD AND APPARATUS THEREFOR

BACKGROUND OF THE INVENTION

This invention relates to a method of and apparatus for electron beam welding which is carried out by electron beams passing through magnetic shielding means provided for an electron gun and more particularly to a method of and apparatus for electron beam welding which can be effected continuously without interruption when dissimilar metals are welded.

In general, an electron beam welding apparatus is provided with an electron gun and a driving table disposed in vacuum. The electron gun emits electron beams to an abutment between two metals, whereby the metals are melted and welded at the abutment. In application of the electron beam welding to dissimilar metals, there arise shortcomings in that weld beads formed are deflected and welds formed tend to include non-welded spots for the following reasons. Upon welding of the dissimilar metals, there will be created a hot junction and a cold junction within the materials being welded and thus the resulting thermal electromotive force will bring about the flow of electron currents. The electric current thus produced then brings about a stray magnetic field, such that weld beams are deflected midway due to the interaction between the component of a magnetic field that is in the direction of a welding axis and electron beams. In case where the metals are thin in thickness, even if the electron beams are deflected so that they will be emitted to a portion deviated from the abutment by a little, there is only a little problem because the heat due to emission of the electron beams is transferred to the abutment. In case where the metals are thick in thickness, the above-mentioned serious shortcomings take place.

Hitherto, in order to prevent the electron beams from deflecting when the dissimilar metals are welded, the electron beam welding apparatus is provided at the end of the electron gun with a magnetic shielding pipe made of a high-permeability magnetic material to prevent magnetic fields outside the pipe from reaching the electron beams inside it, and welding is carried out by straight electron beams passing through the magnetic shielding pipe. This kind of the electron beam welding apparatus is shown in FIG. 1 of Japanese Laying-open of Patent Application No. 50-129445 (1975). In this apparatus, in order to prevent the stray magnetic fields from reaching the electron beam inside the magnetic shielding pipe, it is necessary that a distance between the end of the magnetic shielding pipe and the dissimilar metals to be welded is not large, for example within about 10 mm.

On the other hand, spatter and metal vapor expelled from the weld formed around the abutment of the dissimilar metals by electron beam welding deposits on an end surface of the magnetic shielding pipe. The deposition is gradually accumulated and finally contacts with the weld swelled from the surface of the metals to a height of about 4 mm so that further continuation of the welding can not be effected. Therefore, it is necessary to clean up the end of the magnetic shielding pipe on which the deposition is accumulated, with interruption being taken for 2 to 3 minutes in welding of thin members and for 4 to 5 minutes in welding of thick members. The interruption of welding makes welding quality poor because crater takes place in the welding portion. Additionally, the interruption makes welding operation time longer. Therefore, it is desired that welding of the materials to be welded is completed without interruption.

SUMMARY OF THE INVENTION

An object of the invention is to provide a method of and apparatus for electron beam welding, which can carry out welding without interruption for a long time.

Another object of the invention is to provide a method of and apparatus for electron beam welding, which can complete welding of dissimilar metals without interruption, whereby high quality of welding can be obtained.

Briefly stated, a feature of the invention is that means for preventing spatter, vacuum deposition, etc. of weld metal from substantially accumulating on an end portion of magnetic shielding means provided on an electron gun is operated while electron beam welding proceeds.

DESCRIPTION OF THE PREFERRED EMBODIMENTS

Referring to FIGS. 1 to 5, an embodiment of electron beam welding apparatus according to the present invention will be described hereinafter in detail.

Figure 1:
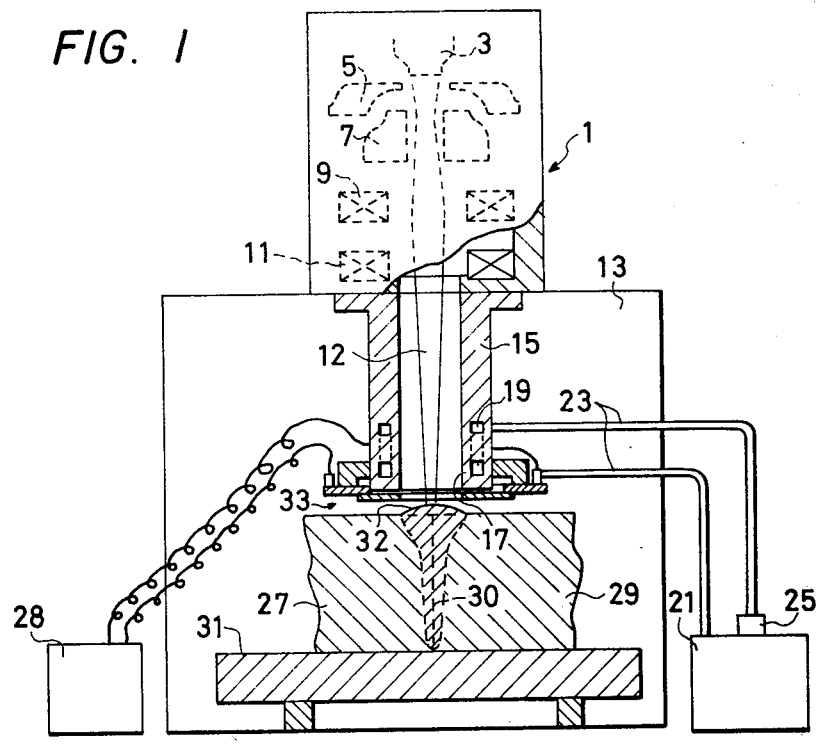
FIG. 1 is a front section view of an embodiment of apparatus for electron beam welding according to the invention.

In FIG. 1, an electron gun 1, which comprises a filament 3, a cathode 5, an anode 7, a focusing coil 9, and a deflection coil 11, is mounted on a vacuum container 13 so that electron beams emitted will run into the vacuum container 13. A magnetic shielding pipe 15 made of a magnetic material, for example low carbon steel is disposed in the vacuum container 13 and secured to the end of the electron gun 1. The magnetic shielding pipe 15 encloses electron beams 12 emitted to shield stray magnetic fields. In the tip portion 17 of the magnetic shielding pipe 15, a cooling water passage 19 is made, and communicates with a water tank 21 disposed out of the vacuum container 13 through water pipes 23 one of which is provided with a pump 25 for circulating cooling water.

Under the magnetic shielding pipe 15, two metals 27, 29 to be welded, for example dissimilar metals are disposed. The metals 27, 29 are moved by a driving table 31 so that an abutment 30 of the two metals 27, 29 will align with electron beams 12 emitted by the electron gun 1. A distance between the upper surfaces of the two metals and the tip surface of the magnetic shielding pipe 15 is about 10 mm. A larger distance brings about bending of emitted electron beams due to stray magnetic fields passing through between the upper surfaces of the metals 27, 29 and the tip surface of the magnetic shielding pipe 15. A smaller distance brings about early contact of a weld 32 formed by welding with metal diposit accummulated on the tip surface of the magnetic shielding pipe 15.

Figure 2:
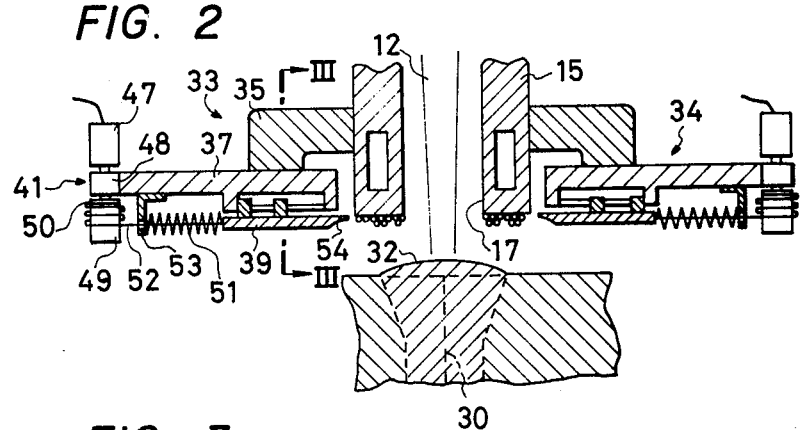
FIG. 2 is an enlarged section view showing a part of FIG. 1.
Figure 3:
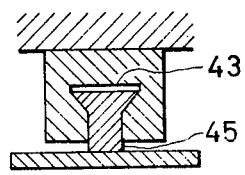
FIG. 3 is a section view taken along a line III—III of FIG. 2.

Referring to FIG. 2, in the tip portion 17 of the magnetic shielding pipe 15, a pair of removing devices 33, 34 for removing metal deposit accummulated on the tip surface of the magnetic shielding pipe 15 are provided. The removing devices 33, 34 each comprise a holder 35 secured to the magnetic shielding pipe 15, a base member 37 secured to the holder 35, a shutter 39 which slides on the base member 37, and driving means 41 mounted on the base member 37 for driving the shutter 39. The base plate 37 has a slideway 43 formed as shown in FIG. 3, and in the slideway 43 two sliders 45 are slidably inserted. The slider 45 secures the shutter 39 at the lower face. The driving means 41 comprises a motor 47, a reduction gear 48 mounted on an end of the base member 37, a drum 49 and a clutch 50 provided on the drum 49 for disconnecting between the reduction gear 48 and the drum 49. The drum 49 is driven by the motor 47 through the reduction gear 48 and the clutch 50. The drum 49 has a rope 52, one end of which is fixed to the drum 49, the other end is jointed to the shutter 39. A spring 51 surrounding the rope 52 is compressed between a stopper 53 secured to the base plate 37 and the shutter 39.

Figure 4:
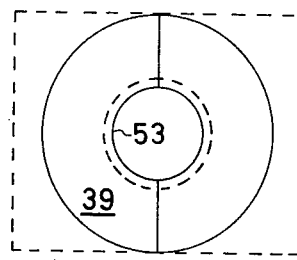
FIG. 4 is a plane view of shutters used for the apparatus for electron beam welding shown in FIG. 1 or 2.

The shutter 39 which may be shaped as a plate, is used as a part of a pair by using another as shown in FIG. 4. A pair of the shutters 39 have a hole 53 formed at a central portion. The inner diameter of the hole 53 is substantially the same as that of the magnetic shielding pipe 15, Each of the shutters 39 has a knife-edge 54 at the inner side, and an annular shape at the outer side. The outer side may be shaped rectangular as shown by a dotted line or in any other shapes. In FIG. 1, numeral 28 shows an electric controller including an electric source.

In operation, the pair of shutters 39 are pulled out to be opened with the rope wound on the drum 49 by the motor 47, whereby the spring 51 is compressed and energized. Under this condition, electron beams are emitted to the abutment portion 30 of the dissimilar materials 27, 29 from the electron gun 1 through the magnetic shielding pipe 15. At this time, the pump 25 is driven for cooling the lower portion of the magnetic shielding pipe 15. As the electron beam welding proceeds, weld 32 is formed about the abutment 30 of the metals, and spatter or metal vapor from the weld 32 is accummulated on the tip surface of the magnetic shielding pipe 15. The metal vapor or the spatter is not welded on the tip surface because the tip surface is cooled by the cooling water.

Figure 5:
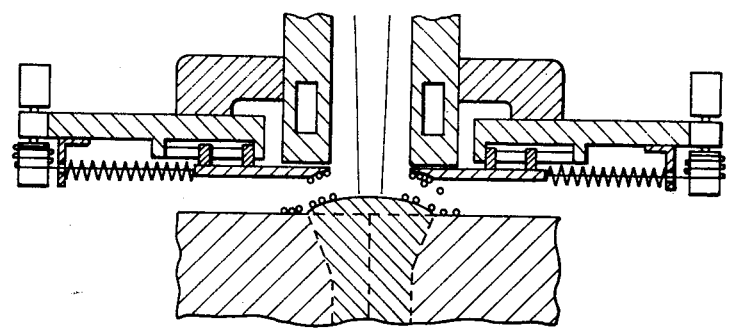
FIG. 5 is an enlarged section view of a part of the apparatus shown in FIG. 1 for explanation of operation.

When metal deposit accummulated on the tip surface of the magnetic shielding pipe 15 reaches a certain amount, the pair of shutter 39 are closed, with the drum 49 freely rotating due to disconnection between the reduction gear 48 and the drum 49 by the operation of the clutch 50, by spring force as shown in FIG. 5 so that the metal deposit is cut off and removed from the tip surface. The cut-off metal deposit drops on and around the weld formed about the abutment of the metals, but quality of the weld is not reduced by the cut-off metal deposit because the cut-off metal deposit is clean metal which does not include any impurities. Therefore, it is not necessary to provide particular means for recovering the cut-off metal deposit. When the pair of shutters 39 are closed, the hole defined by the pair of shutters 39 becomes substantially the same as the inner diameter of the magnetic shielding pipe 15 as previously mentioned so that the electron beam welding is not prevented by the pair of shutters 39. Therefore, the metal deposit such as the spatter or metal vapor accummulated on the tip surface of the magnetic shielding pipe 15 is removed without interruption of the electron beam welding.

After the metal deposit on the tip surface of the magnetic shielding pipe 15 is removed by closing the pair of shutters 39, the pair of shutters 39 are opened by the operation of the driving means 41 so that the pair of shutters 39 will be stood by for a next operation of the removal of the metal deposit. The operation of the removing devices 33, 34 is repeated during welding, and the electron beam welding of the materials is completed thereby to provide them with a perfect joining portion.

In this embodiment, there is used the springs 51. The springs produce large cutting force, with small input received from the driving motor. Therefore, it is enough if a small driving means is provided.

It goes without saying that any other driving means may be used for operating the pair of shutters 39.

Figure 6:
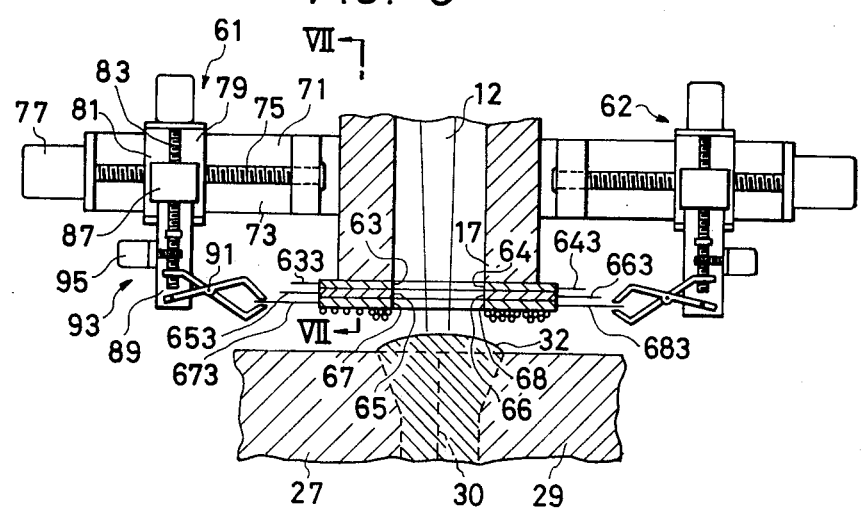
FIG. 6 is a front section view of another embodiment of apparatus for electron beam welding according to the invention.
Figure 7:
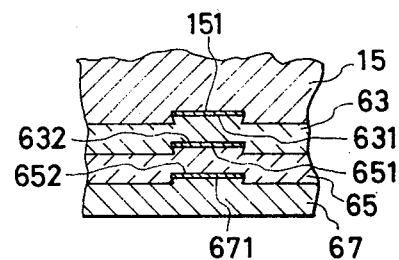
FIG. 7 is a section view taken along a line VII—VII in FIG. 6.
Figure 8:
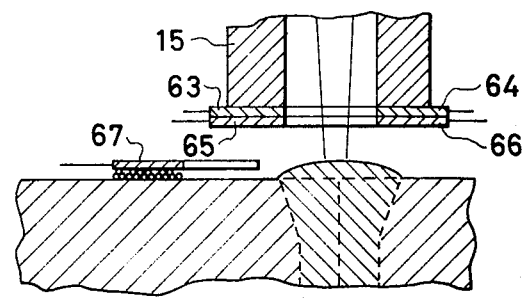
FIG. 8 is a section view showing a part of FIG. 6 for explanation of operation of the apparatus for election beam welding.

Referring to FIGS. 6 to 8, another embodiment of a removing device for removing metal deposit accummulated on an end portion of the magnetic shielding pipe according to the invention will be described hereinafter in detail.

In FIG. 6, on a lower portion of tips 17 of the magnetic shielding pipe 15, there is provided a removing device for removing metal deposit spattered or vacuum evaporated from weld 32 formed by electron beam welding and accummulated on the end portion of the magnetic shielding pipe 15. The removing device comprises a plurality of shutters 63, 64, 65, 66, 67, 68 covering the tip face of the magnetic shielding pipe 15, a pair of driving devices 61, 62 for driving the plurality of shutters 63 to 68. The shutters 63 to 68 are mounted on the tip surface of the magnetic shielding pipe 15 as shown in FIG. 7. Namely, the tip portion of the magnetic shielding pipe 15 is provided with dovetail-shaped recess 151. The shutters 63, 65, 67 have dovetail-shaped projections 631, 651, 671, respectively, and the most upper one 63 and the middle one 65 of the shutters have dovetail-shaped recesses 632, 652, respectively. The uppermost shutter 63 is slidably inserted in the recess 151 of the magnetic shielding pipe 15, and the middle and the lower shutters 65, 67 are inserted in the recesses 632, 652 of the uppermost and middle shutters 63, 65, respectively. The shutters 64, 66, 68 are formed and mounted on the magnetic shielding pipe 15 in the same manner as the shutters 63, 65, 67. The shutters 63 to 68 are formed in substantially the same shape except for the dovetail recesses and projections, and a pair of opposite shutters for example, shutters 63 and 64 are formed annularly when the shutters 63, 64 are mounted and closed. All the shutters 63 to 68 each have pins 633, 643, 653, 673, 683 secured thereto. The pins 633 to 683 become larger in length from the uppermost one to the lower one.

The driving device 61 is constructed as follows: In FIG. 6, a slide plate 71 is secured to the magnetic shielding pipe 15. The slide plate 71 has a sliding face 73, and a screw shaft 75 opposite to the sliding face 73. The screw shaft 75 is supported rotatably at both ends, and is rotated by a first driving motor 77 secured to the slide plate 71. A first movable member 79 has a threaded hole engaged with the screw shaft 75, and is horizontally moved while sliding on the sliding face 73 of the slide plate 71 according to rotation of the screw shaft 75. The first movable member 79 further has a sliding face 81 and a screw shaft 83 opposite to the sliding face 81. The screw shaft 83 is supported rotatably at its both ends, and driven by a second driving motor 85 secured to the first movable member 79. A second movable member 87 has a threaded hole engaged with the screw shaft 83. On the second movable member 87, a supporting member 89 is mounted on which a gripping device 91 is mounted. The grip device 91 comprises a pair of fingers for gripping the pins 633, 653, 673 of the shutters 63, 65, 67, and grip-driving means 93. The grip-driving means 93 comprises a driving motor 95 secured to the supporting member 89, and means for converting the rototion by the driving motor 95 into vertical displacement, which means comprises a worm driven by the motor 95 and a worm gear driven by the worm, which gear, as shown, will move one of the fingers relative to the other finger. A pinion and a rack, or the like not shown, alternatively may be used as the converting means. A driving device 62 for driving the shutters 64, 66, 68 is constructed in the same construction as the driving device 61.

In operation, before electron beams 12 are emitted to the dissimilar metals 27, 29, the end portion 17 of the magnetic shielding pipe 15 is covered by the plurality of shutters 63 to 68. Under the condition of the shutters 63 to 68 as shown in FIG. 6, electron beam welding is effected. When metal deposit is accummulated on the lower shutters 67, 68, for example immediately before the metal deposit is about to contact with the weld 32, the gripping device 91 grips the pins 673, 683 of the lower shutters 67, 68 by operation of the driving motor 95. The shutters 67, 68 are pulled out as shown in FIG. 8, with the first movable member 79 being horizontally displaced by rotation of the screw shaft 75. After the lower shutters 67, 68 are removed from the end portion 17 of the magnetic shielding pipe 15, the middle shutters 65, 66 are exposed to spatter or metal vapor as shown in FIG. 8. The gripping device 91 is positioned by horizontal movement of the first movable member 79 and vertical movement of the second movable member 87 to a place that the gripping device 91 can grip the pins 653, 663 of the middle shutters 65, 66. Such an operation of the removing devices 61, 62 is repeated while the electron beam welding proceeds, whereby welding of the metal 27, 29 are completed without interruption of emission of electron beams.

What is claimed:

1. An apparatus for electron beam welding, comprising:
    electron gun means for emitting electron beams from its tip;
    magnetic shielding means mounted on the tip of the electron gun and surrounding emitted electron beams with a spacing therebetween, for shielding stray magnetic fields from the electron beams that will pass from the tip of the shielding means opposite from said gun means to a welding area;
    means provided around the tip of the magnetic shielding means for removing metal deposit accumulated on the magnetic shielding means during welding while said electron gun means is emitting electron beams without interrupting welding and without interrupting the electron beams; and
    the means for removing metal deposit comprising a pair of knife edges with a passage between them in a closed position for emitted electron beams, and driving means for driving the pair of knife edges along a surface of the tip of the magnetic shielding means towards each other to the closed position, and away from each other and away from the electron beam to an open position, to cut off metal deposit accumulated on the surface of the tip of the magnetic shielding means while moving towards each other to the closed position.

2. An apparatus for electron beam welding, comprising:
    electron gun means for emitting electron beams from its tip;
    magnetic shielding means mounted on the tip of the electron gun and surrounding emitted electron beams with a spacing therebetween, for shielding stray magnetic fields from the electron beams that will pass from the tip of the shielding means opposite from said gun means to a welding area;
    means provided around the tip of the magnetic shielding means for removing metal deposit accumulated on the magnetic shielding means during welding while said electron gun means is emitting electron beams without interrupting welding and without interrupting the electron beams; and
    the means for removing metal deposit comprising a plurality of pairs of plates covering the tip surface of the magnetic shielding means, each pair of plates having a passage for emitted electron beams and being movable along the tip surface of the magnetic shielding means and driving means for driving the plurality of pairs of plates one pair by one pair to expose a fresh pair of the plurality of plates by pulling off the pair of plates on which metal deposit is accumulated.

3. The apparatus as defined in claim 2, wherein said pairs of plates are stacked on top of each other in the direction of the electron beam between the tip surface of the magnetic shielding means and the welding area parallel to each other;
    each pair of plates having a closed position where they are closely adjacent each other to form therebetween the passage for the emitted electron beams; and
    said driving means driving each pair of plates separately from the other pair of plates from its closely adjacent position to a position removed from between the tip surface of the magnetic shielding means and the welding area.

4. An apparatus for electron beam welding, comprising:
    electron gun means for emitting electron beams from its tip;
    magnetic shielding tube means mounted on the electron gun, having a tip portion, and for shielding stray magnetic fields from the electron beams;
    a vacuum chamber enclosing at least the tip portion of the magnetic shielding tube means;
    cooling means for cooling the tip portion of the magnetic shielding tube means;
    a pair of plates slidably mounted for movement between a closed position and an open position on the tip portion of the magnetic shielding tube means, the pair of plates providing, in their central portions in the closed position, a passage for electron beams passing through the magnetic shielding tube;

driving means provided on the tip portion of the magnetic shielding means for driving the pair of plates between their closed and opened positions and so that movement of said plates from the open position toward each other to the closed position will cut off metal deposit accumulated on the tip portion of the magnetic shielding tube; and control means disposed out of the vacuum chamber and electrically connected with the driving means for electrically controlling the driving means.

5. An apparatus for electron beam welding as defined in claim 4, wherein the driving means comprise ropes each connected to one of the pair of plates, drum means for winding the ropes to move the plates to their open position and releasing freely the ropes, and spring means engaged with the pair of plates for driving them to their closed position with spring force of the spring means energized by winding the rope and when the rope is released freely to cut off the metal deposit on the tip surface of the magnetic shielding means.

6. A method of welding two metals by an electron beam welding apparatus, comprising the steps of:

providing an electron beam gun and a magnetic field shield aligned with the electron beam gun to provide a passage of the electron beam from the gun through the shield toward a welding area;

supporting two metals to be welded in the welding area so that an abutment of the two metals will align with the passage of the electron beam from the electron gun through the shield to the welding area, and spacing the two metals from the adjacent end of the shield a predetermined distance;

simultaneously emitting electron beams from the electron gun through the magnetic field shield to the abutment of the two metals within the welding area to thereby weld the two metals together, which will result in metal depositing on the adjacent end of the magnetic field shield;

removing the metal deposit accumulated on the adjacent end of the magnetic field shield during the welding of the two metals without interrupting the step of emitting and without interrupting the welding of the two metals; and said step of removing including providing a plurality of plates stacked in the direction of the passage of the electron beam at the adjacent end of the magnetic field shield so as to accumulate the metal deposit on the plates exposed to and facing the two metals being welded, and removing the plates on which the metal deposit has accumulated from the weld area so as to expose the next plates in the stack of plates to the welding area to thereafter accumulate the metal deposit on said next plates while continuing the step of emitting and welding throughout the step of removing.

* * * * *